US006282641B1

(12) United States Patent
Christensen

(10) Patent No.: US 6,282,641 B1
(45) Date of Patent: Aug. 28, 2001

(54) SYSTEM FOR RECONFIGURING A BOOT DEVICE BY SWAPPING THE LOGICAL DEVICE NUMBER OF A USER SELECTED BOOT DRIVE TO A CURRENTLY CONFIGURED BOOT DRIVE

(75) Inventor: Michael Christensen, Irvine, CA (US)

(73) Assignee: Phoenix Technologies Ltd., San Jose, CA (US)

( * ) Notice: Subject to any disclaimer, the term of this patent is extended or adjusted under 35 U.S.C. 154(b) by 0 days.

(21) Appl. No.: 09/195,311

(22) Filed: Nov. 18, 1998

(51) Int. Cl.[7] .................................................. G06F 9/445
(52) U.S. Cl. .............................. 713/2; 709/222; 710/10
(58) Field of Search ............................ 713/1, 2, 100; 709/220, 221, 222, 301; 712/245; 710/8, 10, 104, 103

(56) References Cited

U.S. PATENT DOCUMENTS

| 5,274,816 | | 12/1993 | Oka ........................................ 395/700 |
| 5,355,498 | * | 10/1994 | Provine et al. ........................ 395/700 |
| 5,491,788 | | 2/1996 | Cepulis et al. . |
| 5,696,968 | | 12/1997 | Merkin . |
| 5,701,429 | * | 12/1997 | Legvold et al. ....................... 711/114 |
| 5,715,456 | * | 2/1998 | Bennett et al. ........................... 713/2 |
| 5,727,213 | * | 3/1998 | Vander Kamp et al. ............. 709/301 |
| 5,758,118 | * | 5/1998 | Choy et al. ........................... 711/114 |
| 5,790,850 | | 8/1998 | Natu . |
| 5,822,582 | * | 10/1998 | Doragh ..................................... 713/2 |
| 5,964,874 | * | 10/1999 | Gross et al. ........................... 713/100 |
| 6,012,130 | * | 1/2000 | Beyda et al. ........................... 711/173 |
| 6,016,402 | * | 1/2000 | Khenson et al. ......................... 713/2 |
| 6,061,788 | * | 5/2000 | Reynaud et al. ......................... 713/2 |
| 6,128,734 | * | 10/2000 | Gross et al. ........................... 713/100 |

FOREIGN PATENT DOCUMENTS

03042751 * 2/1991 (JP) .

* cited by examiner

Primary Examiner—Thomas Lee
Assistant Examiner—Rijue Mai

(57) ABSTRACT

The present invention is an apparatus and method for specifying operation of a boot device in a processor-based system. The apparatus comprises a memory for storing instruction sequences by which the processor-based system is processed and a processor for executing the stored instruction sequences. The stored instruction sequences cause the processor to: (a) determine if a boot process should proceed from a currently specified drive; (b) if not, specify a drive from which the boot process will proceed; and (c) initiate the boot process.

20 Claims, 5 Drawing Sheets

INT 13 Template Structure

| Name | Offset | Size | Description |
|---|---|---|---|
| | 00h | WORD | Opcode for PUSHD |
| int13Handler | 02h | DWORD | Address of the next INT 13 device in the chain (0 = No more devices) |
| | | WORD | Opcode for PUSHD |
| fdiskParamTable | 08h | DWORD | Address of the devices parameter table (0 = No parameter table available) |
| | 0Bh | BYTE | Opcode for PUSHW |
| physical drive | 0Ch | BYTE | Physical device mapping (0 based) |
| logical drive (e.g. 84h) | 0Dh | BYTE | Logical device mapping (0FFh = No device installed) |
| | 0Eh | BYTE | Opcode for PUSHW |
| int13Protocol | 0Fh | WORD | The INT 13 protocol type |
| | 11h | BYTE | |
| | 12h | WORD | |
| | 14h | BYTE | |
| | 15h | WORD | NEAR JMP address (fdiskBiosInterface) |
| modelNumberPtr | 17h | WORD | Pointer to the model type string in the BCG (String is read from the device) |

*FIG. 2*

SYSTEM FOR RECONFIGURING A BOOT DEVICE BY SWAPPING THE LOGICAL DEVICE NUMBER OF A USER SELECTED BOOT DRIVE TO A CURRENTLY CONFIGURED BOOT DRIVE

BACKGROUND OF THE INVENTION

1. Field of the Invention

The present invention relates generally to computer disk boot systems, and more particularly to an apparatus and method of configuring and booting disk drives in a computer system.

2. Description of the Related Art

The Basic Input/Output System (BIOS) of a computer contains the drivers, or software interfaces for hardware devices of the computer. These devices include the keyboard, the display, the printer, auxiliary devices such as the serial port, the computer's clock and the boot disk device. Part of the BIOS is built into each computer by the computer's manufacturer. This part of the BIOS is called the resident BIOS. It is also known as the Read Only Memory (ROM) BIOS because it is contained in ROM chips located on the computer system board. The ROM BIOS serves as an interface with the computer hardware; it controls the hardware devices installed in a computer. It also presents a standardized interface to application and operating system software.

The second part of the BIOS is nonresident; it is read into random access memory (RAM) from disk when the computer boots. The boot operation itself performs two functions. It runs a power-on self test (POST) of the computer and searches disk drives for an operating system. When these functions are complete, the boot operation begins the process of reading the operating system files from disk and copying them to a location in the computer's RAM. The Master Boot Record is read first, followed by the Disk Operating System (DOS) Boot Record. After loading the disk BIOS, the DOS Boot Record is no longer required and is over written in RAM by other code.

BIOS disk services are typically invoked through the use of an interrupt (INT 13$h$ and/or 40$h$) and are selected by loading the service number into a dedicated register in the processor. In particular, hard drives are typically invoked through the use of INT 13$h$, while BIOS-controlled floppy drives are invoked through the use of INT 40$h$. Disk drives are identified by a zero-based number provided in another dedicated register, with the highest order bit set to 1 to indicate a hard disk. Thus, the first floppy disk drive in the computer is identified by drive number 00$h$ and the first hard disk drive is designated by drive number 80$h$. The BIOS uses a set of descriptive parameter tables called disk-base tables to gain information regarding the capabilities of the disk controller hardware and the disk media. During start up, the BIOS associates an appropriate disk-based table with each hard disk drive.

There has been developed a disk process in which a hard disk drive may be installed in the order specified by the user. Each hard disk drive is configured by assigning its respective interface routine to a location on the INT 13$h$ chain. Once the drive has been configured, it is assigned a logical drive number from 80$h$ to 9Fh. The first drive that is installed is configured as 80$h$, the second as 81$h$, etc. The operating system subsequently recognizes drive 80$h$ as the boot device.

Currently, once the devices have been installed in the INT 13$h$ chain, the logical drive number cannot be altered. While this ensures that the boot process will commence from a specific drive, it poses a problem if the user determines, prior to booting, that the boot process should commence from another device. In addition, even if the user were to reconfigure the boot process to commence from another logical drive, such as logical drive 81$h$, the operating system would override such an instruction and would commence to boot from drive 80$h$.

Accordingly, there is a need in the technology for an apparatus and method for facilitating the selection of a boot device from a plurality of disk drives that are installed on a computer system.

BRIEF SUMMARY OF THE INVENTION

The present invention is an apparatus and method for specifying operation of a boot device in a processor-based system. The apparatus comprises a memory for storing instruction sequences by which the processor-based system is processed and a processor for executing the stored instruction sequences. The stored instruction sequences cause the processor to: (a) determine if a boot process should proceed from a currently specified drive; (b) if not, specify a drive from which the boot process will proceed; and (c) initiate the boot process.

BRIEF DESCRIPTION OF THE DRAWINGS

FIG. 2 illustrates one embodiment of an INT 13$h$ template that is utilized by the present invention.

DETAILED DESCRIPTION OF THE PREFERRED INVENTION

Figure 1:
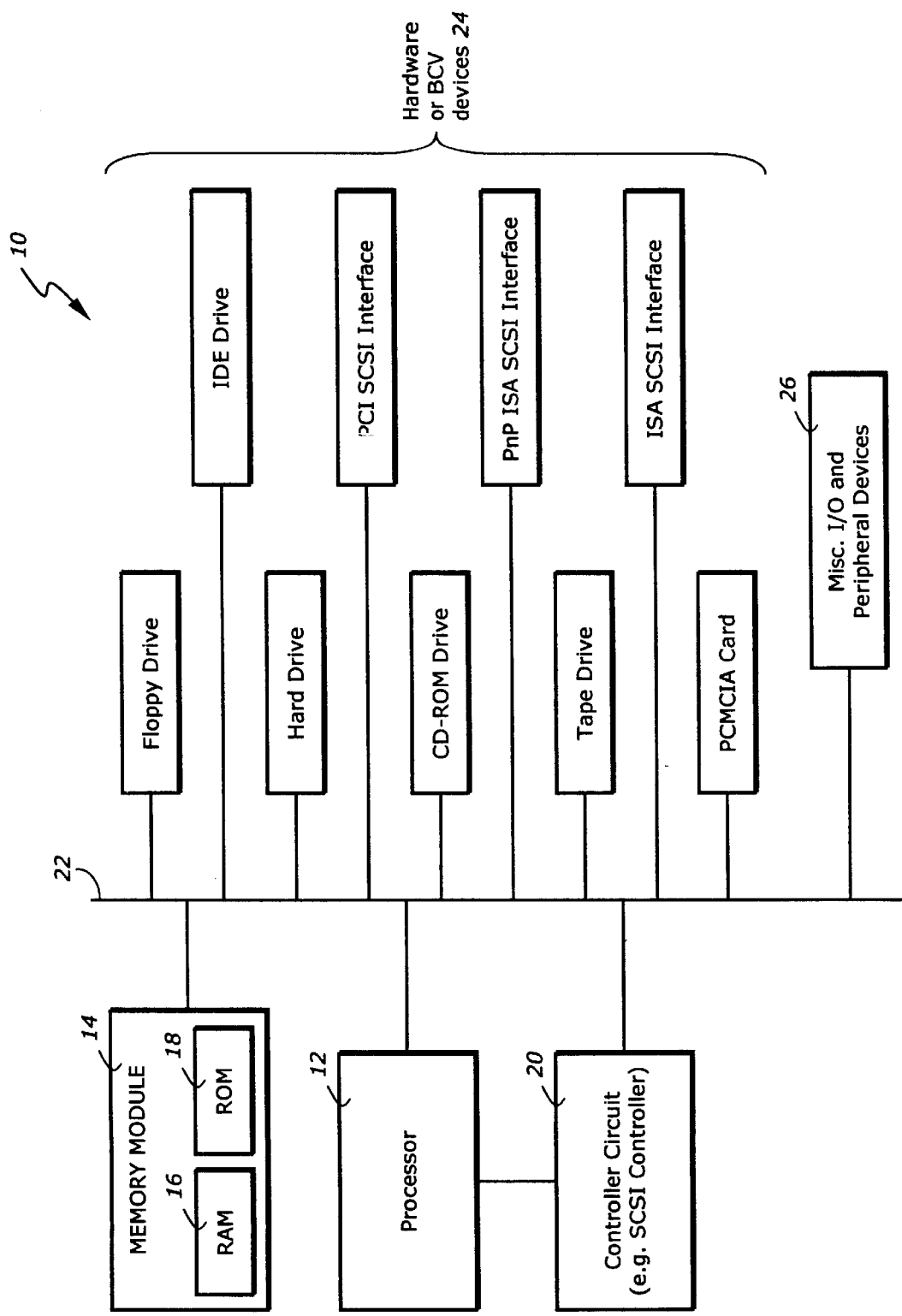
FIG. 1 is a system block diagram of an exemplary processor system in which the apparatus and method of the present invention is used.

The present embodiment is described in reference to a processor system 10. FIG. 1 illustrates an exemplary processor system 10 which implements the processes of the present invention. The processor system 10 comprises a processor 12 and a memory module 14. The memory module 14 includes random access memory (RAM) 16 and read-only memory (ROM) 18. In one embodiment, the memory module 14 also includes a main memory or a dynamic random access memory (DRAM). The processing system 10 also comprises a controller circuit 20 such as a SCSI controller. The processor 12, memory module 14 and controller circuit 20 are coupled to a system bus 22. The processor system 10 also comprises hardware devices 24 and various I/O and peripheral devices 26 which are coupled to the system bus 22. Examples of the hardware devices 24 include, but are not limited to a floppy drive, a hard drive, a PCMCIA card, a CD-ROM drive, a network interface, a tape drive a Universal Serial Bus boot device, an IDE drive and a SCSI drive. Examples of the I/O devices 26 include a keyboard, a mouse and a console.

Stored in ROM 18 is a Basic Input/Output System ("BIOS") program. The BIOS program is a collection of drivers, or software interfaces for hardware devices such as the console (keyboard and display), a generic printer, the auxiliary device (serial port), the computer's clock and the boot disk device. The BIOS is typically embedded in programmable, read only memory (PROM). Often, the BIOS functions themselves are actually copied from PROM into RAM 16, taking advantage of the faster access times of RAM 16. This is known as "shadowing" the BIOS because two copies of BIOS results: one in PROM (which will no longer be used) and the other in RAM 16. The portion of RAM 16 which stores the BIOS is known as the BIOS shadow space. The BIOS, when executed by the processor 12, configures the processor 12 to execute POST operations and to initialize the various hardware devices 24 and the miscellaneous I/O and peripheral devices 26.

Located in memory module 14 is a boot connection vector (BCV) device record which contains the identity of the hardware devices or BCV devices (such as hard disk drives) that are coupled to the system bus 20. FIG. 1 also illustrates one embodiment of the BCV device control system as utilized by the present invention. As shown, a first plurality of the BCV devices are controlled by the BIOS routine while a second plurality of the BCV devices are controlled by the controller circuit 20. The BCV device record, which includes a list of the BIOS-controlled devices and a list of the non-BIOS controlled BCV devices, is created during initialization of the processor system 10, and stored in shadow RAM. The BCV record further comprises the logical device numbers and the entry points of the BCV devices installed on the system 10.

Associated with each BIOS-controlled BCV device is an interrupt INT 13$h$ template structure stored in memory module 14, which contains the address offsets of the interrupt (INT) 13$h$ handler, the disk parameter table, the physical drive, the logical drive, the INT 13$h$ protocol and a model number of a corresponding BIOS-controlled BCV device. FIG. 2 illustrates one embodiment of an INT 13$h$ template that is utilized by the present invention. The INT 13$h$ template also includes the physical and logical drive number of the corresponding BIOS-controlled hardware device 24. Thus, there is an INT 13$h$ template structure for each BIOS-controlled hardware device 24. In alternate embodiments, an INT 40$h$ template structure similar to the interrupt INT 13$h$ template structure, may be used to implement the present invention in addressing BIOS-controlled floppy disk drives.

Figure 3:
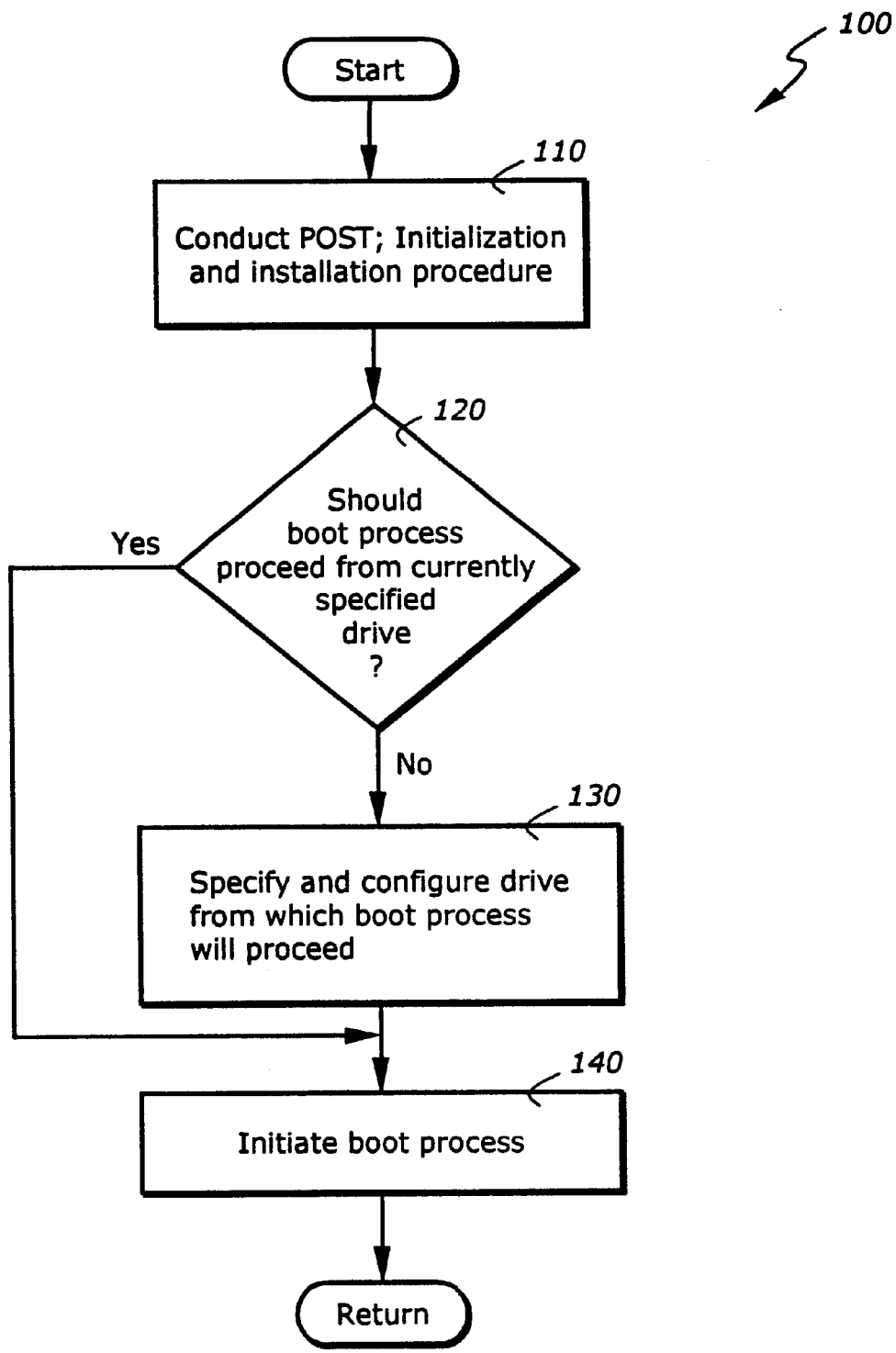
FIG. 3 is a flow chart illustrating one embodiment of the boot drive selection and configuration process provided in accordance with the principles of the present invention.

The present invention facilitates the selection and configuration of a hardware devices or a BCV device (such as a hard disk drive) from a plurality of hardware device or BCV devices 24 (such as a plurality of hard disk drives) that are installed on the processor system 10. FIG. 3 is a flow chart illustrating one embodiment of the boot drive selection and configuration process provided in accordance with the principles of the present invention. Beginning from a start state, the process 100 proceeds to process block 110, where it conducts power on self test (POST), initialization and installation procedures. At this juncture, the hardware devices 24 and the I/O and peripheral devices 26 are initialized and installed. Hardware devices 24 that are configured to be controlled by BIOS are installed on the INT 13$h$ template structure. The boot connection vector (BCV) device record is also created at this juncture.

The process 100 then proceeds to decision block 120, where it determines if the boot process should proceed from a currently specified drive. If not, the process 100 proceeds to process block 130, where the user is prompted to specify the drive from which the boot process should proceed. The process 100 then configures the specified drive for the booting process. The process 100 then advances to process block 140, where it initiates the booting process. If, at decision block 120, the process 100 determines that the boot process should proceed from the currently specified drive, the process would proceed directly to process block 140. Upon completing the boot process, the process 100 terminates.

Figure 4A:
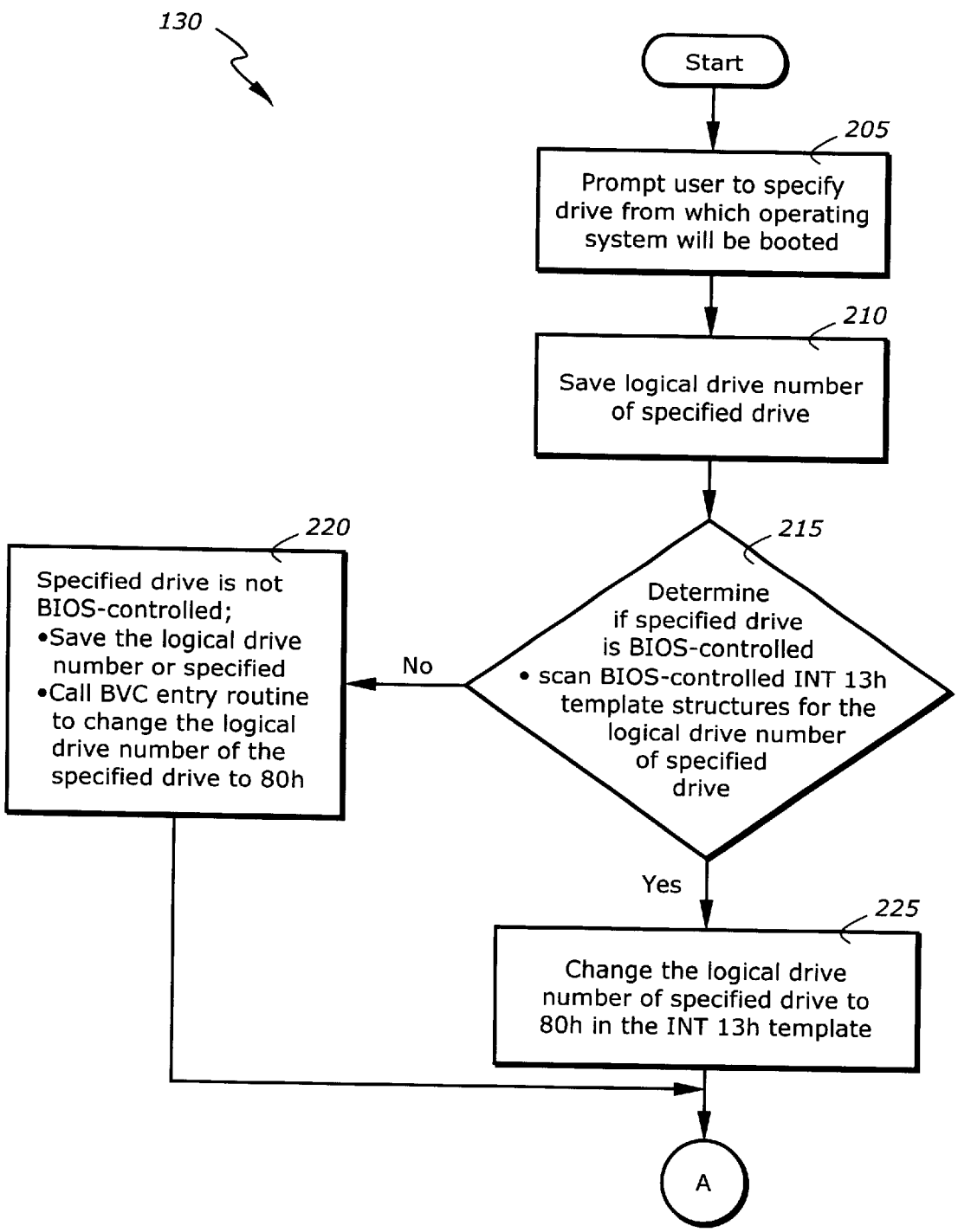
FIGS. 4A and 4B are flowcharts which illustrate one embodiment of the boot drive specification and configuration process 106 of FIG. 3.
Figure 4B:
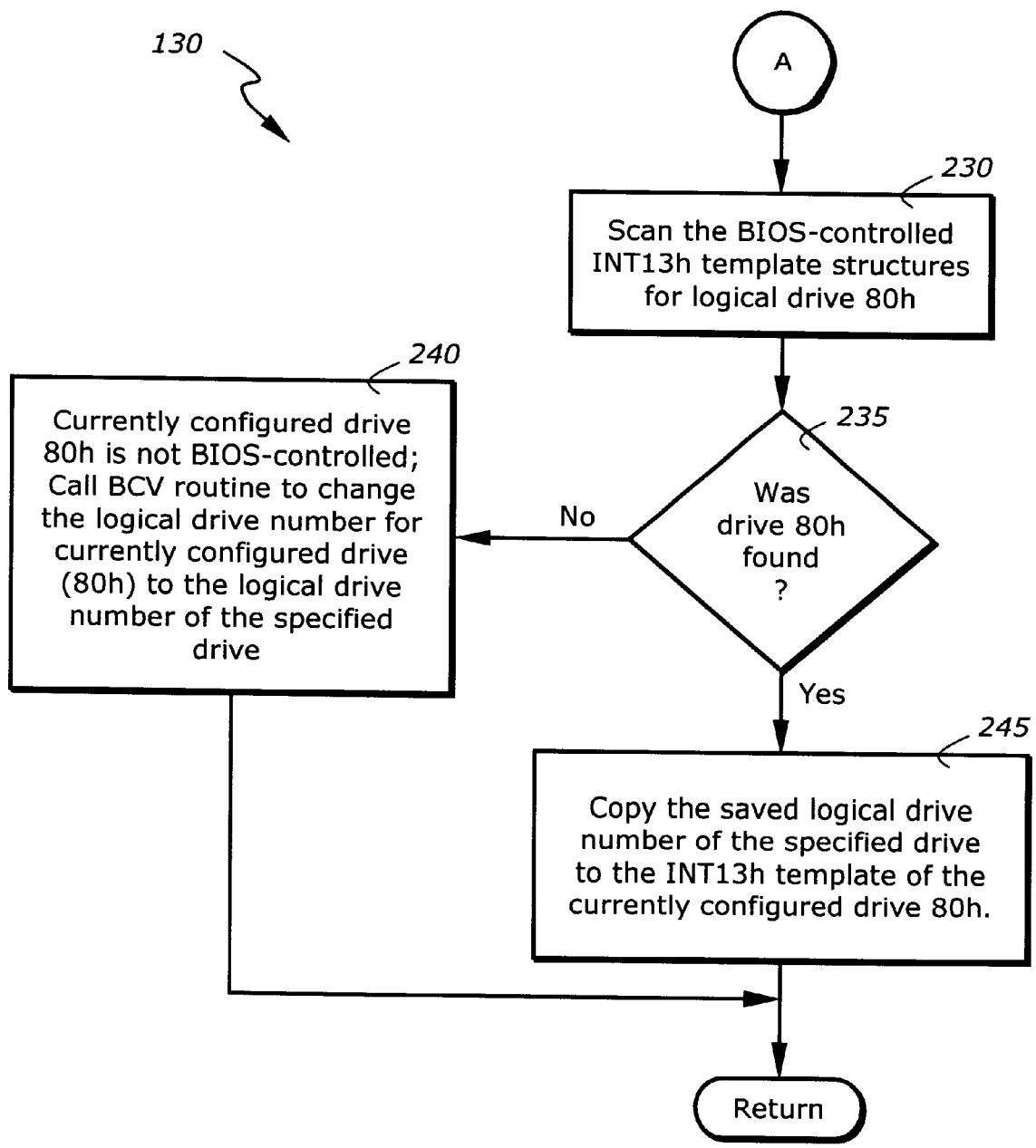

FIGS. 4A and 4B are flowcharts which illustrate one embodiment of the boot drive specification and configuration process 130 of FIG. 3. Beginning from a start state, the process 130 proceeds to process block 205 where it prompts the user to specify the drive from which the operating system will be booted. The process 130 then proceeds to process block 210, where it saves the logical drive number of the specified drive. The process 130 then determines if the specified drive is BIOS-controlled, as shown in decision block 215. This is accomplished by scanning the BIOS-controlled INT 13$h$ template structures, such as that shown in FIG. 2. If the specified drive is not BIOS-controlled (that is, the logical drive number of the specified drive was not found on any of the BIOS-controlled INT 13$h$ template structures), the process 130 proceeds to process block 220, where it calls the BCV entry routine to change the logical drive number of the specified drive to 80$h$. The process 130 then proceeds to process block 230. If however, the logical drive number of the specified drive was found on one of the BIOS-controlled INT 13$h$ template structures, the process 130 proceeds to process block 225, where it changes the logical drive number of the specified drive to 80$h$ in the corresponding INT 13$h$ template structure. The process 130 then proceeds to process block 230.

At process block 230, the process 130 scans the BIOS-controlled INT 13$h$ template structure for logical drive 80$h$. It then proceeds to decision block 235, where it determines if logical drive 80$h$ was found in the BIOS-controlled INT 13$h$ template structure. If not, the process proceeds to process block 240, where it determines that the currently configured drive 80$h$ is not BIOS-controlled. The process 130 then proceeds to call the BCV routine to hang the logical drive number for the currently configured drive 80$h$ to the logical drive number of the specified drive. The process then returns to the main process. However, if the drive 80$h$ as found on one of the INT 13$h$ template structures, the process proceeds to process block 245, where it copies the saved logical drive number of the specified drive to the INT 13$h$ template of the currently configured drive 80$h$. The process 130 then returns to the main process.

The present invention thus provides an apparatus and method for facilitating the selection of a boot device from a plurality of disk drives that are installed on a computer system. Such an apparatus and method provides flexibility for booting from one of a plurality of devices.

Although the present invention has been described in terms of certain preferred embodiments, other embodiments apparent to those of ordinary skill in the art are also within the scope of this invention. Accordingly, the scope of the invention is intended to be defined only by the claims which follow.

What is claimed is:

1. An apparatus for reconfiguring a boot device from a plurality of boot devices, based on user input, during power on self test in a processor-based system, comprising:

a memory for storing instruction sequences by which the processor-based system is processed; and a processor for executing the stored instruction sequences; and wherein the stored instruction sequences cause the processor to:

(a) determine if a boot process should proceed from a currently configured device, said currently configured device being assigned a first logical device number;
(b) if not,
(b.1) prompt a user to specify a device from which the boot process will proceed,
(b.2) save a logical device number assigned to the device as a second logical device number,
(b.3) change the logical device number assigned to the device to the first logical device number to indicate that the device is the boot device, and
(b.4) change the logical device number assigned to the currently configured device to the second logical device number saved in (b.2) to indicate that the currently configured device is no longer the boot device; and
(c) initiate the boot process.

2. The apparatus of claim 1, wherein the first logical device number is 80h, and the second logical device number is one of 81h, 82h, 83h, and 84h.

3. The apparatus of claim 1, wherein the first logical device number is 00h, and the second logical device number is one of 01h, 02h, 03h, and 04h.

4. The apparatus of claim 1, wherein (b) further comprises determining if the device is BIOS-controlled.

5. The apparatus of claim 4, wherein determining if the device is BIOS-controlled comprises determining if data relating to the device is located in a predetermined BIOS-controlled memory structure.

6. The apparatus of claim 5, wherein if the device is BIOS-controlled, (b.3) comprises changing the logical device number assigned to the device in the memory structure to one of 80h and 00h.

7. The apparatus of claim 6, wherein if the device is BIOS-controlled, (b.4) comprises copying the second logical device number saved in (b.2) to the logical device number of the currently configured device in the memory structure.

8. The apparatus of claim 6, wherein if the device is not BIOS-controlled, (b.3) comprises calling a boot routine to change the logical device number assigned to the device to one of 80h and 00h.

9. The apparatus of claim 8, wherein if the device is not BIOS-controlled, (b.4) comprises calling a boot routine to change the logical device number assigned to the currently configured device to the second logical device number.

10. A computer-executable method for configuring a boot device from a plurality of disk drives, based on user input, during power on self test in a processor-based computer system, comprising:
(a) determining whether to boot from a currently configured drive, said currently configured drive being assigned a first logical number;
(b) if not,
(b.1) prompting a user to specify a drive to boot from,
(b.2) saving a logical device number assigned to the drive as a second logical device number,
(b.3) changing the logical device number assigned to the drive to the first logical device number to indicate that the drive is the boot device, and
(b.4) changing the logical device number assigned to the currently configured drive to the second logical device number saved in (b.2) to indicate that the currently configured device is no longer the boot device; and
(c) initiating the boot process.

11. The method of claim 10, wherein the first logical device number is 80h, and the second logical device number is one of 81h and higher.

12. The method of claim 11, wherein the first logical device number is 00h, and the second logical device number is one of 01h and higher.

13. The method of claim 10, wherein (b) further comprises determining if the device is BIOS-controlled.

14. The method of claim 13, wherein determining if the specified device is BIOS-controlled comprises determining if data relating to the device is located in a predetermined BIOS-controlled memory structure.

15. The method of claim 14, wherein if the device is BIOS-controlled, (b.3) comprises changing the logical device number assigned to the device in the memory structure to one of 80h and 00h.

16. The method of claim 15, wherein if the device is BIOS-controlled, (b.4) comprises copying the second logical device number saved in (b.2) to the logical device number of the currently configured device in the memory structure.

17. The method of claim 16, wherein if the device is not BIOS-controlled, (b.3) comprises calling a boot routine to change the logical device number assigned to the device to one of 80h and 00h.

18. The method of claim 17, wherein if the device is not BIOS-controlled, (b.4) comprises calling a boot routine to change the logical device number assigned to the currently configured device to the second logical device number.

19. A computer program product comprising:
a computer usable medium having computer readable program code embodied therein to reconfiguring a boot device from a plurality of boot devices, based on user input, during power on self test in a processor based system, the computer readable program code in said computer program product comprising:
first computer readable program code to determine if a boot process should proceed from a currently configured device that is assigned a predetermined logical device number;
second computer readable program code to prompt a user to specify the device to boot from;
third computer readable program code to save a device number of the device specified by the user as a selected logical device number;
fourth computer readable program code to change the device number of the device to the predetermined logical device number to indicate that the device is the boot device;
fifth computer readable program code to change the device number of the currently configured device to the selected logical device number to indicate that the currently configured device is not the boot device; and
sixth computer readable program code to initiate the boot process.

20. The computer program product of claim 19, wherein the predetermined logical device number is one of 80h and 00h.

* * * * *